United States Patent
Hämeen-Anttila

(10) Patent No.: US 8,849,896 B2
(45) Date of Patent: Sep. 30, 2014

(54) DYNAMIC POLLING CONTROL FOR CONTENT DISTRIBUTION

(75) Inventor: Tapio Hämeen-Anttila, Espoo (FI)

(73) Assignee: Nokia Corporation, Espoo (FI)

(*) Notice: Subject to any disclaimer, the term of this patent is extended or adjusted under 35 U.S.C. 154(b) by 1848 days.

(21) Appl. No.: 11/580,949

(22) Filed: Oct. 16, 2006

(65) Prior Publication Data

US 2008/0091773 A1    Apr. 17, 2008

(51) Int. Cl.
G06F 15/16 (2006.01)
G06F 15/173 (2006.01)
H04L 29/08 (2006.01)
H04L 29/06 (2006.01)

(52) U.S. Cl.
CPC .............. *H04L 67/06* (2013.01); *H04L 67/325* (2013.01); *H04L 69/28* (2013.01); *H04L 67/04* (2013.01); *H04L 67/125* (2013.01)
USPC ............................ 709/203; 709/223; 709/230

(58) Field of Classification Search
CPC ...................................................... H04L 67/325
USPC ............................................................ 709/223
See application file for complete search history.

(56) References Cited

U.S. PATENT DOCUMENTS

| | | | | |
|---|---|---|---|---|
| 5,107,494 | A * | 4/1992 | Johnson et al. | 370/315 |
| 5,922,054 | A * | 7/1999 | Bibayan | 719/328 |
| 2004/0024869 | A1 | 2/2004 | Davies | |
| 2005/0027846 | A1* | 2/2005 | Wolfe et al. | 709/223 |
| 2005/0135410 | A1 | 6/2005 | Stephens | |
| 2005/0240666 | A1 | 10/2005 | Xu et al. | |

FOREIGN PATENT DOCUMENTS

| | | |
|---|---|---|
| EP | 0 577 177 A1 | 1/1994 |
| EP | 1 775 911 A1 | 4/2007 |
| WO | WO 2004/023267 A2 | 3/2004 |

OTHER PUBLICATIONS

Zeng et al. Efficient scheduling of periodic information monitoring requests. Apr. 14, 2005. pp. 583-599.*
Capone et al. Efficient Polling Schemes for Bluetoot h picocells. IEEE. 2001.*
International Search Report PCT/FI2007/050554 filed Oct. 15, 2007.

* cited by examiner

*Primary Examiner* — Bryan Lee
(74) *Attorney, Agent, or Firm* — Harrington & Smith

(57) ABSTRACT

The invention allows controlling content distribution polling dynamically. A predetermined event is detected. In response, client-specific polling instants are determined in order to arrange the client-specific polling instants into polling time slots, wherein each polling time slot has no more than a predetermined maximum amount of polling instants. The determined client-specific polling instants are then sent to their respective clients.

10 Claims, 3 Drawing Sheets

DYNAMIC POLLING CONTROL FOR CONTENT DISTRIBUTION

BACKGROUND OF THE INVENTION

1. Field of the Invention

The invention relates to content distribution systems utilizing client-server architecture. In particular, the invention relates to a novel and improved dynamic control of content distribution polling.

2. Description of the Related Art

Increasing data transmission capacity of wireless networks, such as mobile telecommunication networks, has recently allowed downloading larger and larger files to mobile terminal devices more conveniently than ever. At the same time, increasing capabilities of the mobile terminal devices, such as higher processing power, larger storage resources and higher quality color displays, have allowed processing ever increasing amounts of information.

As a result, new services requiring large amounts of data to be transferred and processed have been made possible, such as various multimedia services which are growing in popularity.

As an example, there has recently been provided various content distribution services which typically allow downloading content, e.g. multimedia content, automatically to mobile terminal devices.

Often, these content distribution solutions are subscription based. That is, a user subscribes to a set of services for a given subscription period, e.g. 30 days, and all the content associated with the subscribed set of services is automatically delivered to a terminal device of the user during the subscription period.

The above automatic downloading is typically implemented by utilizing polling in a client-server architecture. That is, at given polling intervals, content distribution client software installed in the terminal device of the user sends a polling request message to a content distribution server inquiring whether there is new content, such as multimedia files, for downloading. In response, the content distribution server sends a polling response message to the content distribution client software which polling response message informs whether there is new downloadable content. If there is new downloadable content, the polling response message typically includes information about the download location of this new downloadable content after which the content distribution client software typically proceeds to download the new content automatically to the terminal device of the user. Consequently, the user may view the downloaded content at leisure. The download location may be at the polled server, or a separate server may be utilized for storage purposes.

Typically, when a user first subscribes to a set of services, a system administrator assigns a polling interval to the user. The polling interval indicates the frequency at which the content distribution client software sends polling request messages. The polling interval may be e.g. 15 minutes. Typically, the polling interval is client or user specific. In addition to the polling interval, a polling window is also often assigned to the user. The polling window indicates a time period when the content distribution client software may send polling request messages to the content distribution server. The polling window may be e.g. 9 p.m. to 7 a.m. Typically, the polling interval and the polling window are sent from the content distribution server to the content distribution client software when the user first subscribes to a set of services. Furthermore, the installation time of the content distribution client software typically serves as a starting point from which subsequent polling times will be determined. For example, if the content distribution client software was installed at 3.02 p.m., and the assigned polling window is from 9 p.m. to 7 a.m., and the assigned polling interval is 15 minutes, then the first polling time will be 9.02 p.m., the second polling time will be 9.17 p.m., and so on.

There is, however, a significant problem with the above described content distribution arrangement in regards to server overloading due to a sudden rush of polling request messages. A typical content distribution arrangement may include e.g. hundreds of users. In prior art, the polling request messages sent from all the terminal devices of these users are not synchronized in any way with each other. As a result, at one second, the content distribution server may receive a multitude of polling request messages. Yet, after a minute, there may be several tens of seconds without any polling request messages received. In other words, the load of the content distribution server receiving the polling request messages is not distributed evenly over time. Therefore, at times the content distribution server may not be able process incoming traffic which will result in instability of the content distribution arrangement.

As described above, the installation time of the content distribution client software to a given terminal device typically serves as a starting point from which subsequent polling times will be determined for that combination of content distribution client software and terminal device. Therefore, if for example ten clients are installed to the system at the same time, each of the clients will be assigned the same polling times. In addition, latency caused by e.g. network conditions between a content distribution client and the content distribution server or by the content distribution server being under heavy load or overloaded, may result in uncontrollable shifts in polling times.

FIG. 3a illustrates the above described prior art random distribution of polling times. Time block 300 comprises sub-blocks 301-320. Five clients have been assigned polling times in sub-block 302, five clients in sub-block 306, nine clients in sub-block 312, one clients in sub-block 313, three clients in sub-block 316, and four clients in sub-block 319. In other words, the polling times of the various clients are distributed randomly over the time block 300.

Therefore, the object of the present invention is to alleviate the problems described above and to introduce a solution that allows content distribution with polling instants of multiple clients distributed more uniformly over predetermined polling time slots.

SUMMARY OF THE INVENTION

A first aspect of the present invention is an apparatus that comprises a polling processor configured to receive from multiple clients polling request messages querying about status of downloadable content in a content distribution system, and to respond with polling response messages, wherein the polling request messages have been sent at client-specific polling instants. The apparatus of the first aspect further comprises a polling controller configured to re-calculate, in response to a detected predetermined event, the client-specific polling instants in order to arrange the client-specific polling instants into polling time slots, each polling time slot having no more than a predetermined maximum amount of polling instants, and to send the re-calculated client-specific polling instants to their respective clients.

A second aspect of the present invention is an apparatus that comprises a polling processing means for receiving from multiple clients polling request messages querying about status of downloadable content in a content distribution system, and for responding with polling response messages, wherein the polling request messages have been sent at client-specific polling instants. The apparatus of the second aspect further comprises a polling controlling means for re-calculating, in response to a detected predetermined event, the client-specific polling instants in order to arrange the client-specific polling instants into polling time slots, each polling time slot having no more than a predetermined maximum amount of polling instants, and for sending the re-calculated client-specific polling instants to their respective clients.

A third aspect of the present invention is a method in which a predetermined event is detected. In response, client-specific polling instants are determined in order to arrange the client-specific polling instants into polling time slots, wherein each polling time slot has no more than a predetermined maximum amount of polling instants, and wherein the client-specific polling instants define, for content distribution clients, instants for sending polling request messages that query about status of downloadable content tent in a content distribution system. Then, the determined client-specific polling instants are sent to their respective clients.

A fourth aspect of the present invention is an apparatus that comprises a polling request sender configured to send, at given polling instants, polling request messages querying about status of downloadable content in a content distribution system. The apparatus of the fourth aspect further comprises a polling response receiver configured to receive polling response messages, each sent in response to one of the polling request messages. The apparatus of the fourth aspect further comprises a polling instant processor configured to replace the given polling instants with re-calculated polling instants included in at least one of the received polling response messages, wherein the re-calculated polling instants have been arranged into polling time slots, wherein each polling time slot has no more than a predetermined maximum amount of polling instants.

A fifth aspect of the present invention is a method in which polling request messages are sent at given polling instants which polling request messages query about status of downloadable content in a content distribution system. Furthermore, polling response messages are received, wherein each of the polling response messages was sent in response to one of the polling request messages. The given polling instants are replaced with re-calculated polling instants included in at least one of the received polling response messages, wherein the re-calculated polling instants have been arranged into polling time slots, wherein each polling time slot has no more than a predetermined maximum amount of polling instants.

A sixth aspect of the present invention is an apparatus that comprises a polling request sending means for sending, at given polling instants, polling request messages querying about status of downloadable content in a content distribution system. The apparatus of the sixth aspect further comprises a polling response receiving means for receiving polling response messages, each sent in response to one of the polling request messages. The apparatus of the sixth aspect further comprises a polling instant processing means for replacing the given polling instants with re-calculated polling instants included in at least one of the received polling response messages, wherein the re-calculated polling instants have been arranged into polling time slots, wherein each polling time slot has no more than a predetermined maximum amount of polling instants.

In an embodiment of the invention, the sending of the re-calculated client-specific polling instants is performed by including the re-calculated client-specific polling instants in the polling response messages, e.g. along with information about the status of the downloadable content.

In an embodiment of the invention, the predetermined event comprises at least one of: an increase in the amount of the clients, a decrease in the amount of the clients, and latency in the client-specific polling instants.

In an embodiment of the invention, while re-calculating the client-specific polling instants, intermediate time slots of a given length are determined between the polling time slots.

In an embodiment of the invention, the method of the third aspect is performed by a data-processing device controlled by a computer program embodied on a computer readable medium.

In an embodiment of the invention, the method of the fifth aspect is performed by a data-processing device controlled by a computer program embodied on a computer readable medium.

The invention allows content distribution with polling instants of multiple clients distributed more uniformly over predetermined polling time slots so that the amount of polling instants in each polling time slot stays below a predetermined maximum amount at all times. Therefore, the invention facilitates overall stability of content distribution. In addition, the time resources reserved for polling, e.g. a polling window, will be utilized more efficiently since there will no longer be extended "silent" moments of no polling traffic.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
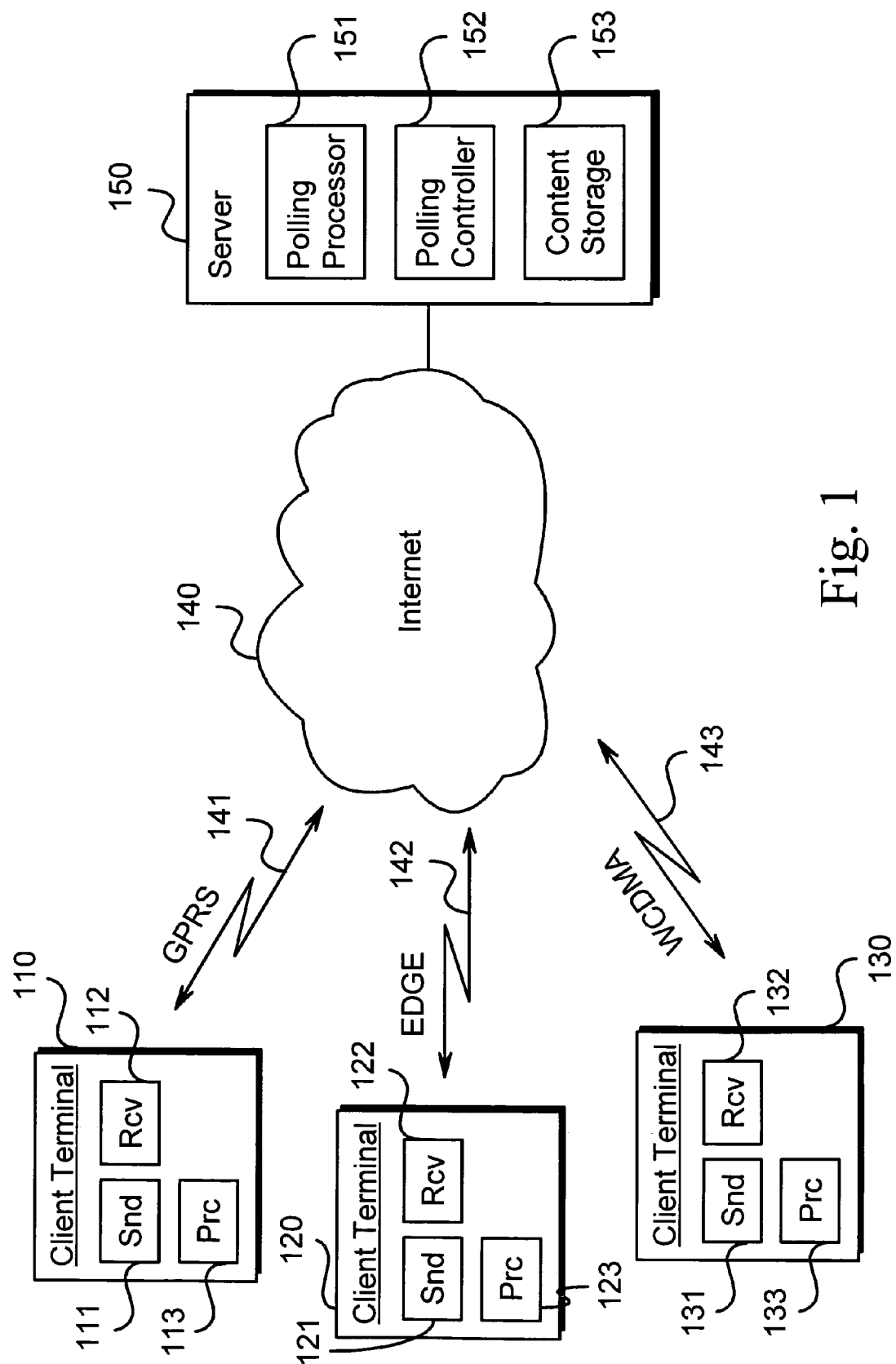
FIG. 1 is a content distribution system according to an embodiment of the present invention.

FIG. 1 illustrates a content distribution system according to an embodiment of the present invention. The content distribution system of FIG. 1 comprises client terminal devices 110, 120, 130. In the embodiment illustrated in FIG. 1 the client terminal devices 110, 120, 130 are mobile telecommunication devices. The client terminal device 110 is connected to Internet 140 via a General Packet Radio Service (GPRS) connection 141. The client terminal device 120 is connected to Internet 140 via an Enhanced Data rates for GSM Evolution (EDGE) connection 142. The client terminal device 130 is connected to Internet 140 via a Wideband Code Division Multiple Access (WCDMA) connection 143. However, it is to be understood that other wireless access systems may be used instead of the GPRS, EDGE and WCDMA wireless access systems illustrated in FIG. 1.

The content distribution system of FIG. 1 further comprises a server 150. The server 150 is configured to provide content distribution services to the multiple client terminal devices 110, 120, 130. The term "content distribution" is used to refer to a service in which content, e.g. multimedia content, is periodically downloaded to multiple clients automatically, i.e. without any interaction required from users. Typically, content distribution is subscription based, i.e. a user subscribes to a set of services for a given subscription period, e.g. 30 days, and all the content associated with the subscribed set of services is automatically delivered to a client terminal device of the user during the subscription period. The client terminal device of the content distribution system polls the content distribution server periodically (ranging typically from once in every fifteen minutes to once in every two hours) in order to find out if there is new downloadable content. Often, a polling window is also assigned to each client terminal device of the content distribution system which polling window indicates a time period (typically at night time when traffic is slow, e.g. 1 a.m. to 6 a.m.) when the client terminal device may poll the content distribution server. After the client terminal device has finished downloading the content—e.g. next morning—the user may view or otherwise utilize the downloaded content at leisure.

Each client terminal device 110, 120, 130 comprises a polling request sender 111, 121, 131, respectively. Each of the polling request senders 111, 121, 131 is configured to send polling request messages querying about status of downloadable content. The polling request messages are sent at polling instants which are specific to each client terminal device. For example, the polling request sender 111 is configured to send its polling request messages at polling instants specific to the client terminal device 110 since the polling request sender 111 resides in the client terminal device 110. Each client terminal device 110, 120, 130 further comprises a polling response receiver 112, 122, 132, respectively. Each of the polling response receivers 112, 122, 132 is configured to receive polling response messages, each of which was sent in response to a polling request message. The polling response messages may contain information about at least one of polling windows, polling instants and download locations.

Each client terminal device 110, 120, 130 further comprises a polling instant processor 113, 123, 133, respectively. Each of the polling instant processors 113, 123, 133 is configured to replace the present polling instants specific to the respective client terminal device 110, 120 or 130 with re-calculated polling instants when such re-calculated polling instants are included in at least one of the received polling response messages. Furthermore, the re-calculated polling instants are arranged into polling time slots, wherein each polling time slot has no more than a predetermined maximum amount of polling instants.

The polling request senders 111, 121, 131, the polling response receivers 112, 122, 132, and the polling instant processors 113, 123, 133 may be implemented e.g. as software, firmware or hardware, or as a combination thereof.

The server 150 comprises a polling processor 151 that is configured to receive the above polling request messages sent from the polling request senders 111, 121, 131. The polling processor 151 is further configured to respond to a received polling request message with a polling response message.

The polling response message may include e.g. information about the status of the downloadable content, i.e. whether there is new downloadable content or not. If there is new downloadable content, the polling response message may include information about the download location of the new downloadable content, such as Uniform Resource Locator (URL) addresses of the new downloadable files. In addition, the polling response message may include information about polling instants, polling windows and polling intervals.

In an embodiment, the polling response message may further include debugging activation data. In accordance with information included in the debugging activation data the receiving client terminal device will download debugging software from a given location, run the downloaded debugging software, and collect and store debugging information. Then, the client terminal device will send the collected debugging information to the server 150, e.g. included in polling request messages. A subsequent polling response message may include debugging deactivation data instructing the client terminal device to delete the debugging software and/or the collected debugging information.

The server 150 of FIG. 1 further comprises a polling controller 152 which is configured to re-calculate, in response to a detected predetermined event, the client terminal device specific polling instants in order to organize them into polling time slots wherein each polling time slot has no more than a predetermined maximum amount of polling instants. The polling controller 152 is further configured to send the re-calculated client terminal device specific polling instants to their respective client terminal devices, e.g. by including the re-calculated client terminal device specific polling instants in the polling response messages.

The predetermined event may be e.g. a detected increase or decrease in the amount of the client terminal devices. In an embodiment, the predetermined event is latency detected in the client terminal device specific polling instants. The latency may be due to e.g. network conditions between at least one of the client terminal devices 110, 120, 130 and the server 150. The latency may also be due to e.g. the server 150 being under heavy load or overloaded and therefore momentarily delayed in performing its tasks.

In an embodiment, the polling controller 152 may be further configured to determine intermediate time slots of a given length between the polling time slots, while re-calculating the client terminal device specific polling instants. The intermediate time slots may be determined e.g. based on the above described detected latency in the client terminal device specific polling instants.

The polling processor 151 and the polling controller 152 may be implemented e.g. as software, firmware or hardware, or as a combination thereof. It is to be understood that even though in the embodiment illustrated in FIG. 1 the polling processor 151 and the polling controller 152 are integrated with the server 150, this does not need to be the case. Rather the polling processor 151 and the polling controller 152 may be implemented separately from the server 150.

The server 150 of FIG. 1 further comprises a content storage 153 which is configured to store the downloadable content. However, it is to be understood that the content storage 153 need not be integrated with the server 150. Rather, the content storage 153 may be implemented separately from the server 150.

The polling request messages and the polling response messages may be e.g. Hypertext Transfer Protocol (HTTP) messages. In such a case, for example the polling request sender 111, 121, or 131 sending a polling request message would open a Hypertext Transfer Protocol connection over the General Packet Radio Service connection 141, the Enhanced Data rates for GSM Evolution connection 142, or the Wideband Code Division Multiple Access connection 143, and the Internet 140, respectively.

Figure 2:
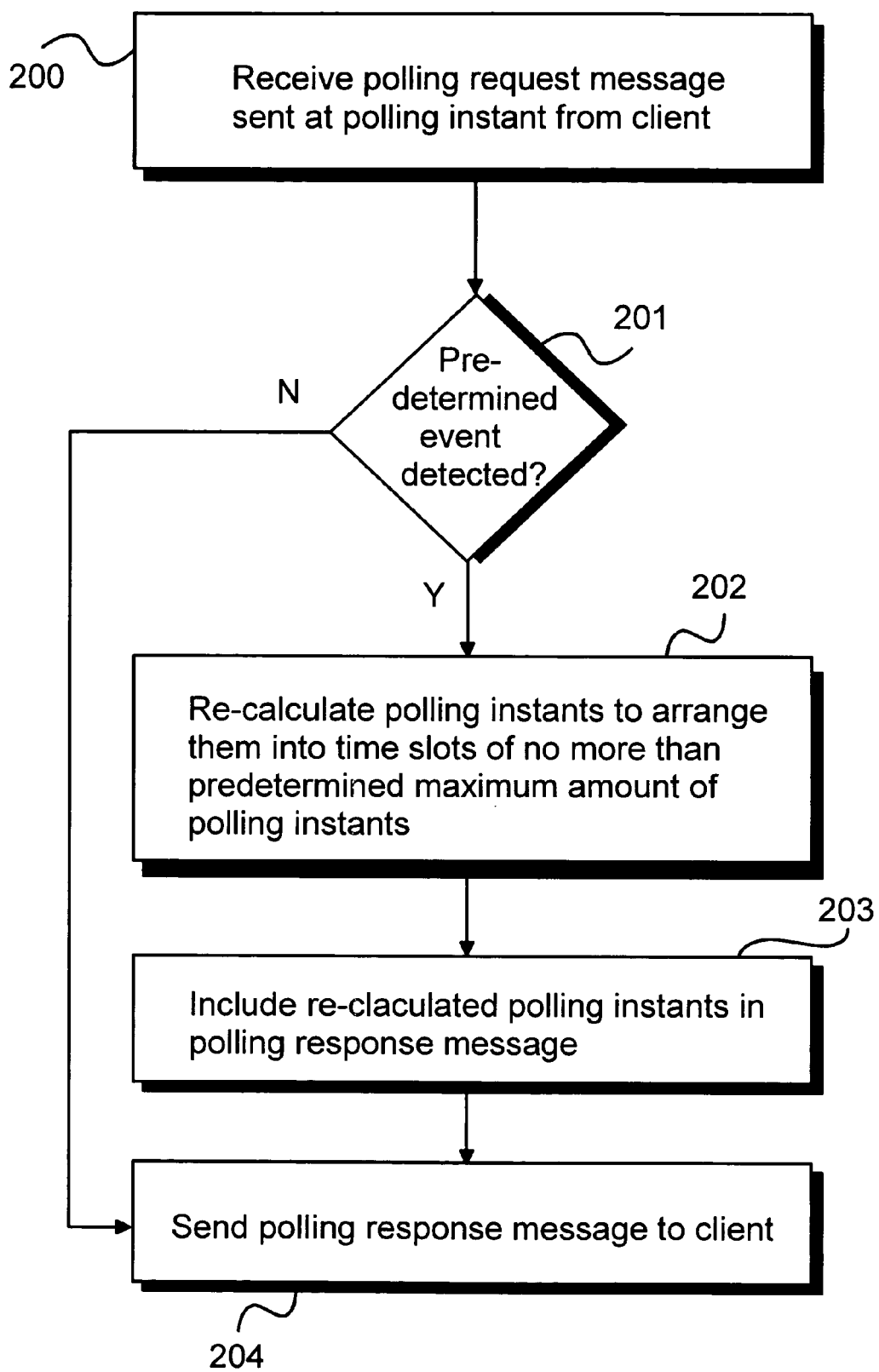
FIG. 2 is a flow diagram illustrating a method according to an embodiment of the present invention.

FIG. 2 illustrates an embodiment of the method of the present invention relating to controlling content distribution polling dynamically according to an embodiment of the present invention. At first, a polling request message is sent and received, step 200. The polling request message queries about status of downloadable content, and the polling request message was sent at a polling instant specific to the sending client.

If, at step 201, a predetermined event is not detected, the method proceeds to step 204 in which a polling response message is sent to the client which sent the polling request message.

However, if a predetermined event is detected at step 201, the method proceeds to step 202 in which the client-specific polling instants are re-calculated in order to arrange the client-specific polling instants into polling time slots, wherein each polling time slot has no more than a predetermined maximum amount of polling instants.

The polling instants may be calculated as specific polling times (e.g. 9.02 p.m., 9.17 p.m., 9.32 p.m., etc.). In another embodiment, the polling instants may be calculated as polling intervals (e.g. 14 minutes, 15 minutes, 1 hour, etc.) from which the client will determine the specific polling times using e.g. the installation time of the client as a starting point.

Next, the polling instants re-calculated for the client that sent the polling request message are included in a polling response message, step 203. Then, the method proceeds to step 204 in which the polling response message now including the re-calculated client-specific polling instants is sent to the client which sent the polling request message. If the re-calculation of step 202 results in changes to polling instants of other clients, then polling response messages including the client-specific polling instants re-calculated for these other clients may also be sent to the other clients at step 204.

After receiving the re-calculated polling instants, the client will send its subsequent polling request messages according to the re-calculated polling instants.

Figure 3A:
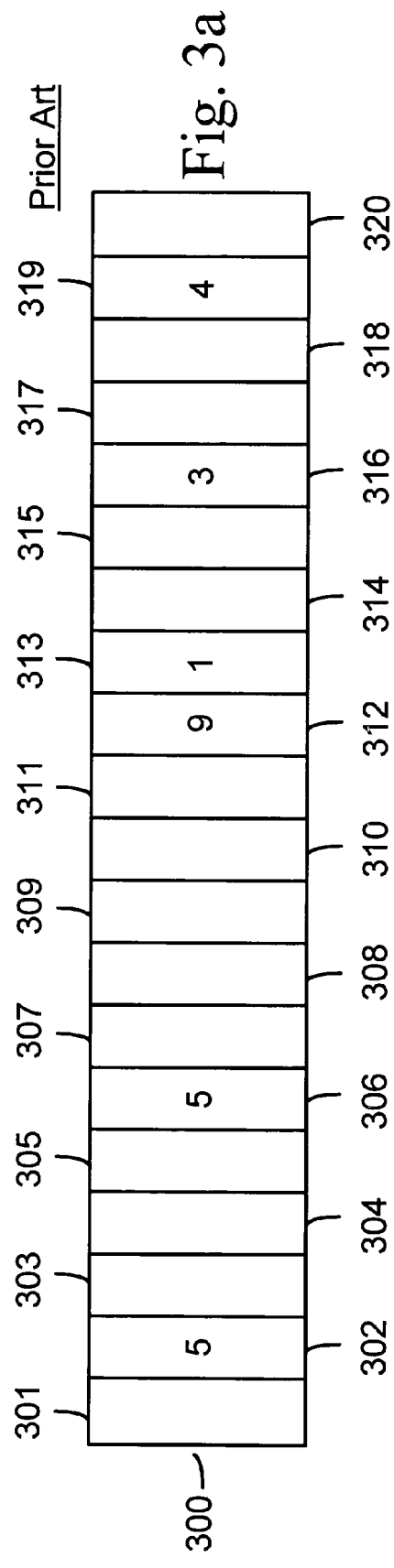
FIG. 3a illustrates randomly distributed polling instants of prior art.
Figure 3B:
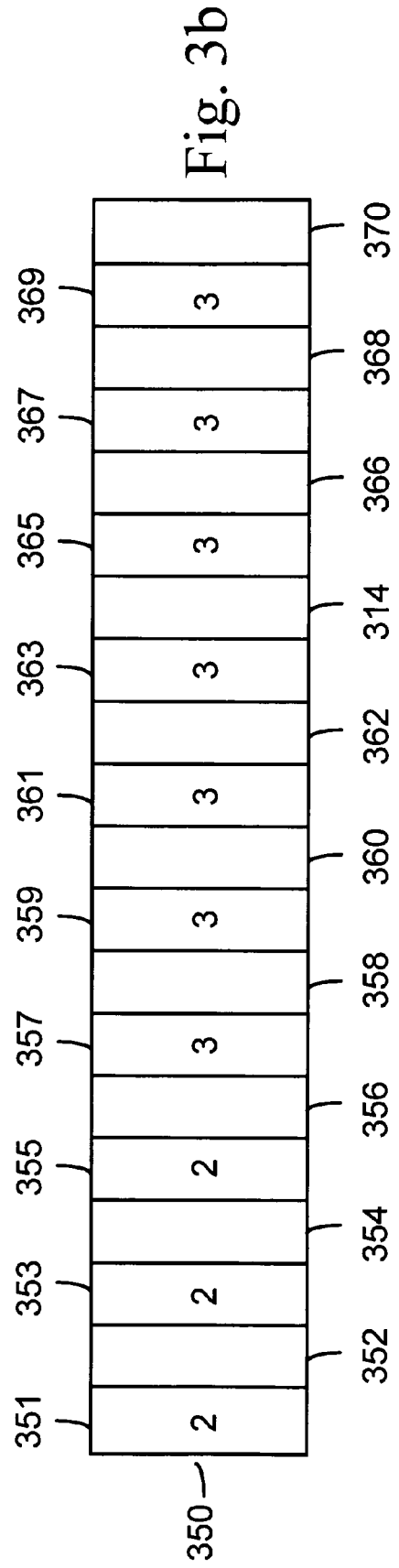
FIG. 3b illustrates more uniformly distributed polling instants of the present invention.

FIG. 3b illustrates more uniformly distributed polling instants of the present invention. Time block 350 comprises polling time slots 351-370. There are two polling instants in polling time slots 351, 353 and 355. There are three polling instants in polling time slots 357, 359, 361, 363, 365, 367 and 369. In other words, the polling instants are distributed more uniformly over the polling time slots than in the prior art case of FIG. 3a. There are no peaks causing server overload, such as the peak 312 of nine polling instants in FIG. 3a. Furthermore, there are no extended "silent" moments, such the period of polling time slots 307-311 in FIG. 3a, due to which the invention allows more efficient use of valuable server resources.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. An apparatus comprising:
   at least one processor; and
   at least one memory including computer program code, where the at least one memory and the computer program code are configured, with the at least one processor, to cause the apparatus to at least:
   receive from multiple client terminal devices, polling request messages querying about a status of downloadable content in a content distribution system, and respond with polling response messages, wherein said polling request messages are received at client-specific polling instants for each of the multiple client terminal devices;
   in response to a predetermined event, re-calculate said client-specific polling instants for each of the multiple client terminal devices in order to arrange the client-specific polling instants used by the multiple client terminal devices into polling time slots each having no more than a predetermined maximum amount of polling instants, wherein the apparatus is further caused to determine intermediate time slots of a given length between the polling time slots, while re-calculating the client-specific polling instants; and
   send the re-calculated client-specific polling instants to their respective client terminal devices to prompt the respective client terminal devices to replace their present polling instants with the re-calculated client-specific polling instants in order to distribute the client-specific polling instants over the polling time slots so that each of the polling time slots has no more than the predetermined maximum amount of polling instants.

2. The apparatus according to claim 1, wherein the apparatus is further caused to perform said sending the re-calculated client-specific polling instants by including the re-calculated client-specific polling instants in the polling response messages.

3. The apparatus according to claim 1, wherein the predetermined event comprises at least one of an increase in an amount of the client terminal devices, a decrease in the amount of the client terminal devices, and latency in the client-specific polling instants.

4. An apparatus comprising:
   a polling processing means for receiving, from multiple client terminal devices, polling request messages querying about a status of downloadable content in a content distribution system, and for responding with polling response messages, wherein said polling request messages are received at client-specific polling instants; and
   a polling controlling means, in response to a detected predetermined event, for re-calculating, for each of the multiple client terminal devices said client-specific polling instants in order to arrange the client-specific polling instants used by the multiple client terminal devices into polling time slots each having no more than a predetermined maximum amount of polling instants, wherein the polling controlling means is further configured to determine intermediate time slots of a given length between the polling time slots, while re-calculating the client-specific polling instants; and means for sending the re-calculated client-specific polling instants to their respective client terminal devices to prompt the respective client terminal devices to replace their present polling instants with the re-calculated client-specific polling instants in order to distribute the client-specific polling instants over the polling time slots so that each of the polling time slots has no more than the predetermined maximum amount of polling instants.

5. A method comprising:
   detecting a predetermined event at a polling processor;
   in response to the detecting the predetermined event, determining, at a polling controller, for each of multiple content distribution clients client-specific polling instants in order to arrange the client-specific polling instants into polling time slots each having no more than a predetermined maximum amount of polling instants, the client-specific polling instants defining, for each of the multiple content distribution clients, instants for sending polling request messages querying about status of downloadable content in a content distribution system, wherein the determining the client-specific polling instants comprises determining intermediate time slots of a given length between the polling time slots; and sending the determined client-specific polling instants from the polling controller to their respective content distribution clients to prompt the respective content distribution clients to replace their present polling instants with the determined client-specific polling instants in order to distribute the client specific polling instants over the polling time slots so that each of the polling time slots has no more than the predetermined maximum amount of polling instants.

6. A non-transitory computer-readable medium encoded with a computer program, the computer program executable by at least one processor to perform operations comprising:

detecting a predetermined event at a polling processor;

in response to the detecting the predetermined event, determining, at a polling controller, for each of multiple content distribution clients, client-specific polling instants in order to arrange the client-specific polling instants used by the multiple content distribution clients into polling time slots each having no more than a predetermined maximum amount of polling instants, the client-specific polling instants defining, for content distribution clients, instants for sending polling request messages querying about status of downloadable content in a content distribution system, wherein the determining the client-specific polling instants comprises determining intermediate time slots of a given length between the polling time slots; and sending the determined client-specific polling instants from the polling controller to their respective content distribution clients to prompt the respective content distribution clients to replace their present polling instants with the determined client-specific polling instants in order to distribute the client-specific polling instants over the polling time slots so that each of the polling time slots has no more than the predetermined maximum amount of polling instants.

7. An apparatus comprising:

at least one processor; and at least one memory including computer program code, where the at least one memory and the computer program code are configured, with the at least one processor, to cause the apparatus to at least:

send, at given polling instants, polling request messages querying about status of downloadable content in a content distribution system;

receive, from a content distribution system, polling response messages, each received in response to one of said sent polling request messages, wherein at least one of the received polling response messages comprise re-calculated polling instants specific to the apparatus, wherein the re-calculated polling instants arrange the polling instants specific to the apparatus into polling time slots each having no more than a predetermined maximum amount of polling instants, and wherein the recalculated polling instants are based at least on intermediate time slots of a given length between the polling time slots; and in response to receiving the re-calculated polling instants, replace said given polling instants with said re-calculated polling instants, wherein the received re-calculated polling instants are used by the apparatus in order to distribute the polling instants over the polling time slots so that each of the polling time slots has no more than the predetermined maximum amount of polling instants.

8. A method comprising:

sending, from a polling request sender, at given polling instants, polling request messages querying about a status of downloadable content in a content distribution system;

receiving polling response messages at a polling response receiver, each received in response to one of said polling request messages, wherein at least one polling response message comprises re-calculated polling instants specific to the polling request sender, wherein the re-calculated polling instants arrange the polling instants into polling time slots each having no more than a predetermined maximum amount of polling instants, and wherein the recalculated polling instants are based at least on intermediate time slots of a given length between the polling time slots; and in response to the received recalculated polling instants, replacing at a polling instant processor of the polling request sender said given polling instants with said re-calculated polling instants, wherein the received re-calculated polling instants are used by the polling request sender in order to distribute the polling instants over the polling time slots so that each of the polling time slots has no more than the predetermined maximum amount of polling instants.

9. A non-transitory computer-readable medium encoded with a computer program, the computer program executable by at least one processor to perform operations comprising:

sending, from a polling request sender, at given polling instants, polling request messages querying about status of downloadable content in a content distribution system;

receiving polling response messages from a polling response receiver, each received in response to one of said sent polling request messages, wherein at least one polling response message comprises re-calculated polling instants specific to the polling request sender, wherein the re-calculated polling instants arrange the polling instants specific to the polling request sender into polling time slots each having no more than a predetermined maximum amount of polling instants, and wherein the recalculated polling instants are based at least on intermediate time slots of a given length between the polling time slots; and in response to the received recalculated polling instants, replacing at a polling instant processor of the polling request sender said given polling instants with said re-calculated polling instants, wherein the received re-calculated polling instants are used by the polling request sender in order to distribute the polling instants over the polling time slots so that each of the polling time slots has no more than the predetermined maximum amount of polling instants.

10. An apparatus comprising:

a polling request sending means for sending, at given polling instants, polling request messages querying about status of downloadable content in a content distribution system;

a polling response receiving means for receiving polling response messages, each received in response to one of said sent polling request messages, wherein at least one polling response message comprises re-calculated polling instants specific to the polling request sender, wherein the re-calculated polling instants arrange the polling instants into polling time slots each having no more than a predetermined maximum amount of polling instants, and wherein the recalculated polling instants are based at least on intermediate time slots of a given length between the polling time slots; and a polling instant processing means, in response to the received recalculated polling instants, for replacing at the polling request sender said given polling instants with said re-calculated polling instants, wherein the received re-calculated polling instants are used by the apparatus in order to distribute the polling instants over the polling time slots so that each of the polling time slots has no more than the predetermined maximum amount of polling instants.

* * * * *